United States Patent
Zhang et al.

(10) Patent No.: US 11,428,930 B2
(45) Date of Patent: Aug. 30, 2022

(54) STRAY LIGHT SUPPRESSION IN EYE-TRACKING IMAGING

(71) Applicant: Meta Platforms Technologies, LLC, Menlo Park, CA (US)

(72) Inventors: Qi Zhang, Kirkland, WA (US); Robin Sharma, Redmond, WA (US); Andrew John Ouderkirk, Redmond, WA (US); Karol Constantine Hatzilias, Kenmore, WA (US); Christopher Yuan-Ting Liao, Seattle, WA (US); Gregory Olegovic Andreev, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 311 days.

(21) Appl. No.: 16/534,861

(22) Filed: Aug. 7, 2019

(65) Prior Publication Data
US 2021/0041692 A1 Feb. 11, 2021

(51) Int. Cl.
| | |
|---|---|
| G02B 27/00 | (2006.01) |
| G01J 5/02 | (2022.01) |
| G02B 27/01 | (2006.01) |
| G02B 27/09 | (2006.01) |

(52) U.S. Cl.
CPC .......... *G02B 27/0093* (2013.01); *G01J 5/024* (2013.01); *G02B 27/0172* (2013.01); *G02B 27/0977* (2013.01); *G02B 2027/0138* (2013.01); *G02B 2027/0178* (2013.01)

(58) Field of Classification Search
CPC ............ G02B 27/0094; G02B 27/0172; G02B 27/0977; G02B 2027/0138; G02B 2027/0178; G01J 5/024
USPC ........................................................ 359/630
See application file for complete search history.

(56) References Cited

U.S. PATENT DOCUMENTS

| | | | |
|---|---|---|---|
| 5,270,748 A | 12/1993 | Katz | |
| 7,731,395 B2 | 6/2010 | Parkyn et al. | |
| 10,365,492 B2* | 7/2019 | Holland | ............... H04N 9/3161 |
| 10,365,550 B2* | 7/2019 | Holland | ................. G02B 27/30 |
| 10,409,057 B2* | 9/2019 | Aleem | ................. G02B 26/101 |

(Continued)

FOREIGN PATENT DOCUMENTS

| | | |
|---|---|---|
| JP | 5867794 B2 | 2/2016 |
| WO | 2018028379 A1 | 2/2018 |

OTHER PUBLICATIONS

Patent Cooperation Treaty, International Search Report, International Application No. PCT/US2020/043714, Notification Date: Oct. 20, 2020, 10 pages.

*Primary Examiner* — Collin X Beatty
(74) *Attorney, Agent, or Firm* — Freestone Intellectual Property Law PLLC; Aaron Visbeek

(57) ABSTRACT

The disclosure includes optical systems and near-eye optical elements configured to suppress stray infrared light. Infrared illuminators illuminator an eyebox area with narrow-band infrared illumination light for eye-tracking. A combiner layer receives reflected infrared light reflected of an eye of the user and directs the reflected infrared light to a camera configured to capture eye-tracking images of an eye of a user. An anti-reflection (AR) coating may be disposed on a base curvature to reduce Fresnel reflections that generate stray light. A ghost suppression component may be paired with the infrared illuminators to reduce stray light becoming incident on the camera.

20 Claims, 8 Drawing Sheets

(56) References Cited

U.S. PATENT DOCUMENTS

| | | | |
|---|---|---|---|
| 10,444,507 B2* | 10/2019 | Urey | G09G 3/02 |
| 10,845,873 B2* | 11/2020 | Huang | G06K 9/00597 |
| 10,901,216 B2* | 1/2021 | Pierer | G02B 27/0172 |
| 2008/0049431 A1* | 2/2008 | Boek | H01L 51/5281 |
| | | | 362/311.06 |
| 2010/0149073 A1* | 6/2010 | Chaum | G02B 27/0172 |
| | | | 345/8 |
| 2012/0019915 A1* | 1/2012 | Yan | B32B 33/00 |
| | | | 359/586 |
| 2016/0018576 A1* | 1/2016 | Yamamoto | C09B 49/12 |
| | | | 359/359 |
| 2018/0157320 A1* | 6/2018 | Trail | G06F 3/011 |

* cited by examiner

STRAY LIGHT SUPPRESSION IN EYE-TRACKING IMAGING

BACKGROUND INFORMATION

Some optical systems may benefit from capturing images of a user's eye. Head mounted displays (HMDs), for example, may perform eye-tracking functions which may enhance the user's viewing experience. Eye-tracking may be aided, in some cases, by illuminating the eye of the user and then capturing images of the illuminated eye. However, various contexts may generate challenges to capturing images of the eye that include sufficient contrast for analyzing the images. In particular, stray light may propagate through an optical system and be received by a camera and thereby increase the background noise for the light propagating along the desired imaging optical path.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
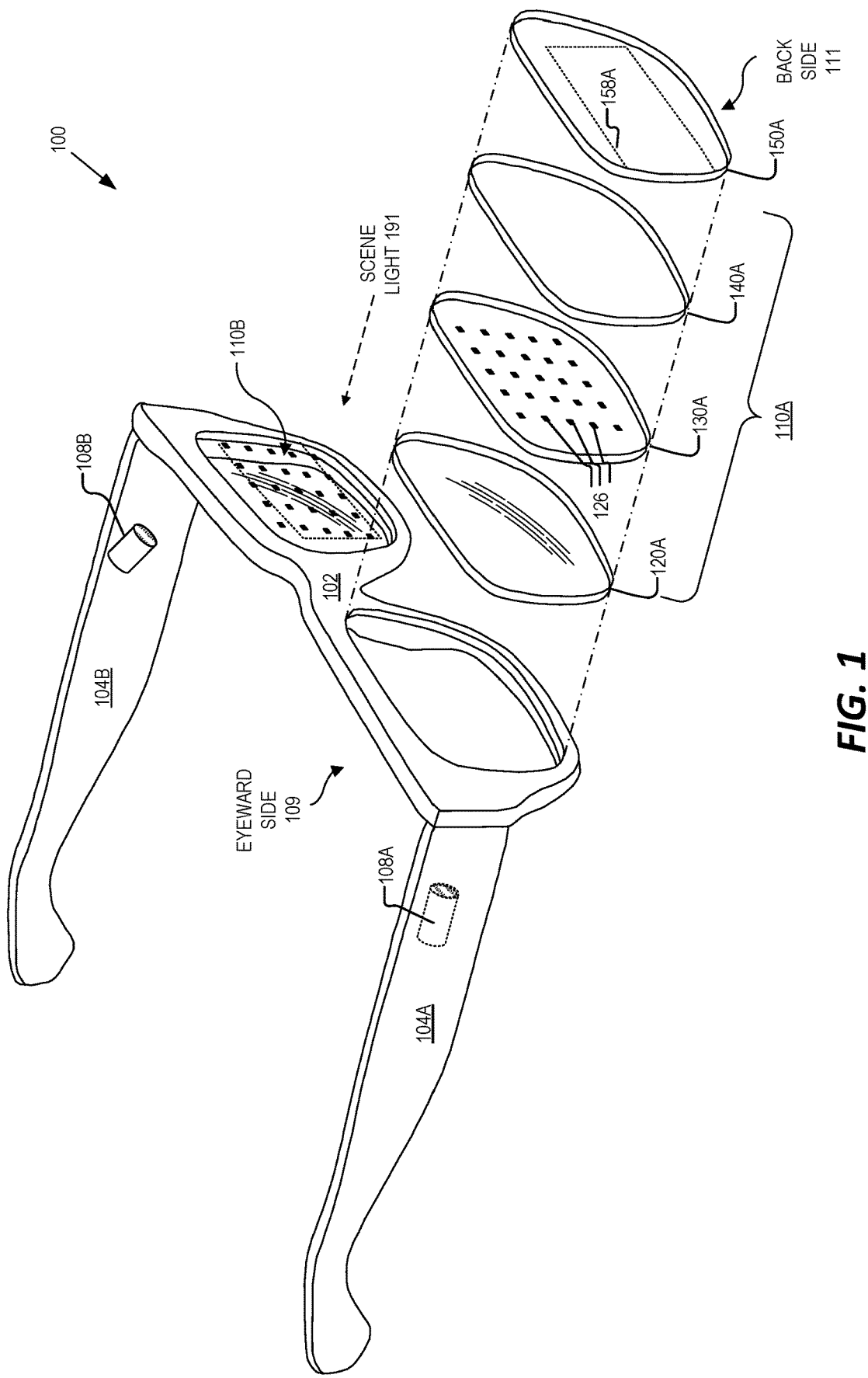
FIG. 1 illustrates an example HMD, in accordance with aspects of the present disclosure.

Embodiments of an optical system for eye-tracking are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The system and device for suppressing stray light in eye-tracking images that are described in this disclosure include incorporating ghost suppression components into infrared illuminators and including anti-reflection coatings on strategic surfaces of an optical system. Eye-tracking modules may include infrared illuminators to illuminate the eye with infrared light and an eye-tracking camera to image the eye. In some eye-tracking modules, the imaging path of the infrared light encounters various optical components and surfaces before becoming incident on the camera. Therefore, stray light may be generated when a portion of the infrared imaging light is reflected when it encounters different surfaces. This stray light may then propagate within the optical system and eventually become incident on the eye-tracking camera and generate ghost images.

In some cases, 15% of infrared illumination light is lost due to reflection when the infrared illumination light encounters an optical interface. When the infrared illumination light encounters a plurality of optical interfaces, the reflection losses compound and a very large portion of the infrared imaging light is lost and the reflected light is stray light that may become incident on the eye-tracking camera as optical noise. Therefore, in embodiments of this disclosure, AR coatings and other ghost suppression components may be strategically positioned to increase transmission of the infrared imaging light and suppress stray light. The AR coatings in this disclosure may be specially tuned to transmit a very-high percentage of both visible light and infrared light even when the angle of incidence (AOI) includes a wide range. Conventional AR coatings are generally designed for visible light at near-normal angle of incidences and not designed to pass visible light and infrared light over a wide AOI range. Optical systems of the disclosure may benefit from transmission of visible light and infrared light due to the requirements of an optical system to pass visible scene light and/or visible display light, in the context of a head mounted display. These and other embodiments are described in more detail in connections with FIGS. 1-8.

FIG. 1 illustrates an example HMD 100, in accordance with aspects of the present disclosure. The illustrated example of HMD 100 is shown as including a frame 102, temple arms 104A and 104B, and near-eye optical elements 110A and 110B. Eye-tracking cameras 108A and 108B are shown as coupled to temple arms 104A and 104B, respectively. FIG. 1 also illustrates an exploded view of an example of near-eye optical element 110A. Near-eye optical element 110A is shown as including an optically transparent layer 120A, an illumination layer 130A, an optical combiner layer 140A, and a display layer 150A. Illumination layer 130A is shown as including a plurality of in-field light sources 126. The in-field light source 126 may be configured to emit infrared illumination light for eye-tracking purposes, for example. Display layer 150A may include a waveguide 158A that is configured to direct virtual images to an eye of a user of HMD 100.

As shown in FIG. 1, frame 102 is coupled to temple arms 104A and 104B for securing the HMD 100 to the head of a user. Example HMD 100 may also include supporting hardware incorporated into the frame 102 and/or temple arms 104A and 104B. The hardware of HMD 100 may include any of processing logic, wired and/or wireless data interface for sending and receiving data, graphic processors, and one or more memories for storing data and computer-executable instructions. In one example, HMD 100 may be configured to receive wired power and/or may be configured to be powered by one or more batteries. In addition, HMD 100 may be configured to receive wired and/or wireless data including video data.

FIG. 1 illustrates near-eye optical elements 110A and 110B that are configured to be mounted to the frame 102. In some examples, near-eye optical elements 110A and 110B may appear transparent to the user to facilitate augmented reality or mixed reality such that the user can view visible scene light from the environment while also receiving display light directed to their eye(s) by way of display layer 150A. In further examples, some or all of near-eye optical elements 110A and 110B may be incorporated into a virtual reality headset where the transparent nature of the near-eye optical elements 110A and 110B allows the user to view an electronic display (e.g., a liquid crystal display (LCD), an organic light emitting diode (OLED) display, a micro-LED display, etc.) incorporated in the virtual reality headset.

As shown in FIG. 1, illumination layer 130A includes a plurality of in-field light sources 126. Each in-field light source 126 may be disposed on a transparent substrate and may be configured to emit light towards an eyeward side 109 of the near-eye optical element 110A. In some aspects of the disclosure, the in-field light sources 126 are configured to emit near infrared light (e.g. 700 nm-1.4 μm). Each in-field light source 126 may be a micro light emitting diode (micro-LED), an edge emitting LED, a vertical cavity surface emitting laser (VCSEL) diode, or a Superluminescent diode (SLED).

Conventional eye-tracking solutions may provide light sources disposed around a rim/periphery of a lens. However, placing light sources within the field of view of the eye may be advantageous for computation of specular or "glint" reflections that can be imaged by a camera such as eye-tracking camera 108A that is positioned to image the eye of a wearer of HMD 100.

While in-field light sources 126 may introduce minor occlusions into the near-eye optical element 110A, the in-field light sources 126, as well as their corresponding routing may be so small as to be unnoticeable or insignificant to a wearer of HMD 100. Additionally, any occlusion from in-field light sources 126 will be placed so close to the eye as to be unfocusable by the human eye and therefore assist in the in-field light sources 126 being not noticeable or insignificant. In some embodiments, each in-field light source 126 has a footprint (or size) that is less than about 200×200 microns.

As mentioned above, the in-field light sources 126 of the illumination layer 130A may be configured to emit infrared illumination light towards the eyeward side 109 of the near-eye optical element 110A to illuminate the eye of a user. The near-eye optical element 110A is shown as including optical combiner layer 140A where the optical combiner layer 140A is disposed between the illumination layer 130A and a backside 111 of the near-eye optical element 110A. In some aspects, the optical combiner 140A is configured to receive reflected infrared light that is reflected by the eye of the user and to direct the reflected infrared light towards the eye-tracking camera 108A. In some examples, the eye-tracking camera 108A is an infrared camera configured to image the eye of the user based on the received reflected infrared light. In some aspects, the optical combiner 140A is transmissive to visible light, such as scene light 191 incident on the backside 111 of the near-eye optical element 110A. In some examples, the optical combiner 140A may be configured as a volume hologram and/or may include one or more Bragg gratings for directing the reflected infrared light towards the eye-tracking camera 108A. In some examples, the optical combiner includes a polarization-selective hologram (a.k.a. polarized volume hologram) that diffracts a particular polarization orientation of incident light while passing other polarization orientations.

Display layer 150A may include one or more other optical elements depending on the design of the HMD 100. For example, the display layer 150A may include a waveguide 158 to direct display light generated by an electronic display to the eye of the user. In some implementations, at least a portion of the electronic display is included in the frame 102 of the HMD 100. The electronic display may include an LCD, an organic light emitting diode (OLED) display, micro-LED display, pico-projector, or liquid crystal on silicon (LCOS) display for generating the display light.

Optically transparent layer 120A is shown as being disposed between the illumination layer 130A and the eyeward side 109 of the near-eye optical element 110A. The optically transparent layer 120A may receive the infrared light emitted by the illumination layer 130A and pass the infrared light to illuminate the eye of the user. As mentioned above, the optically transparent layer 120A may also be transparent to visible light, such as scene light 191 received from the environment and/or display light received from the display layer 150A. In some examples, the optically transparent layer 120A has a curvature for focusing light (e.g., display light and/or scene light) to the eye of the user. Thus, the optically transparent layer 120A, in some examples, may be referred to as a lens. In some aspects, the optically transparent layer 120A has a thickness and/or curvature that corresponds to the specifications of a user. In other words, the optically transparent layer 120A may be a prescription lens. However, in other examples, the optically transparent layer 120A may be a non-prescription lens.

Figure 2:
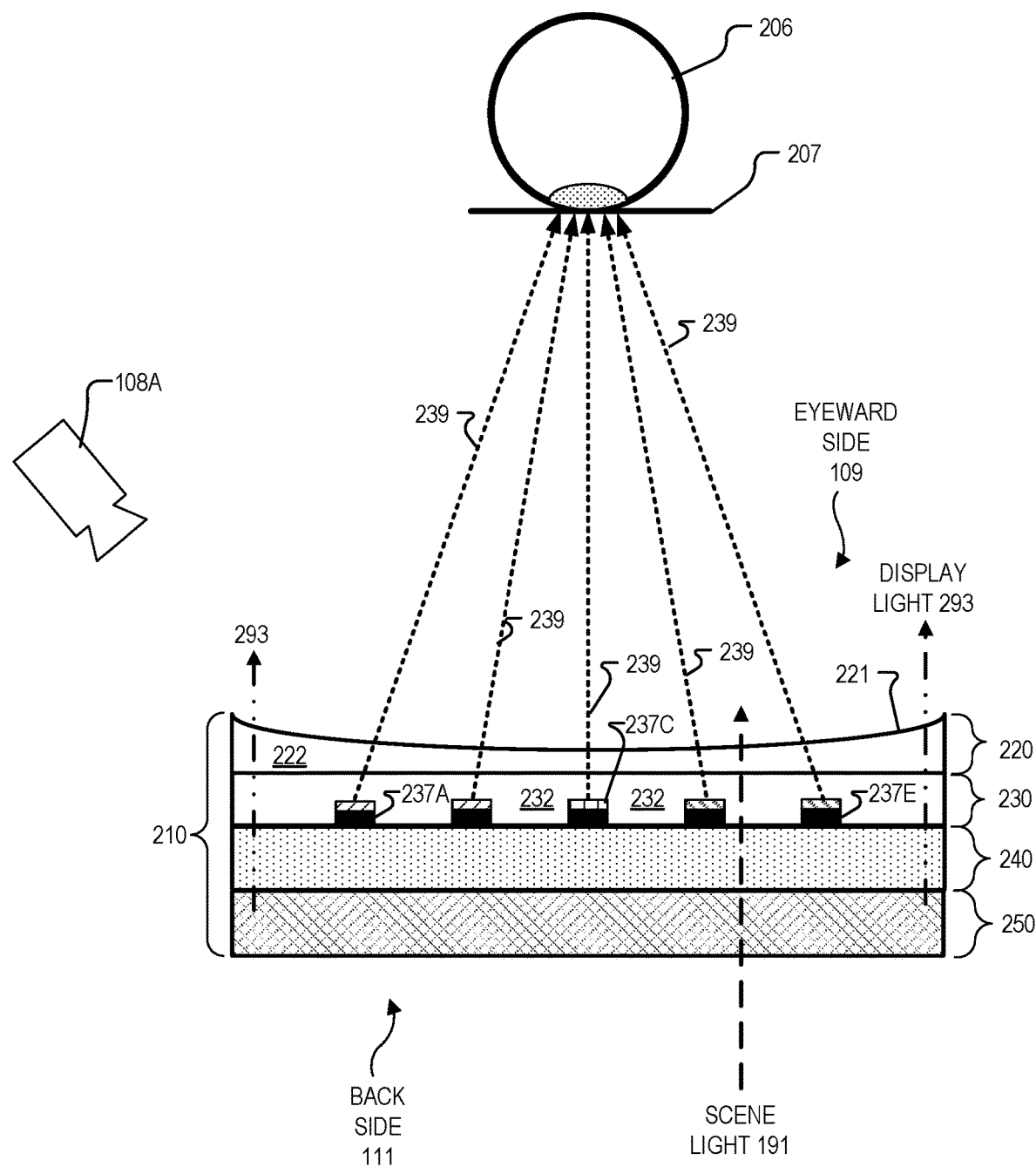
FIG. 2 is a top view of an example near-eye optical element that includes a transparent layer, an illumination layer, a combiner layer, and a display layer.

FIG. 2 is a top view of an example near-eye optical element 210 that includes a transparent layer 220, an illumination layer 230, a combiner layer 240, and a display layer 250. A plurality of infrared illuminators 237 emit infrared illumination light 239 to an eyebox area 207 to illuminate eye 206. FIG. 2 illustrates infrared illuminators 237A-237E. The different infrared illuminators 237 may direct infrared illumination light 239 to eye 206 at different angles depending on the position of the infrared illuminators with respect to eye 206. For example, infrared illuminators 237A and 237E may include beam-forming elements that direct the infrared illumination light to eye 206 at steeper angles compared to infrared illuminator 237C directing infrared illumination light 239 to eye 206 at an angle closer to normal. As described above, infrared illuminators 237 may be VCSELs or SLEDs, and consequently infrared illumination light 239 may be narrow-band infrared illumination light (e.g. linewidth of 1-10 nm).

Figure 7:
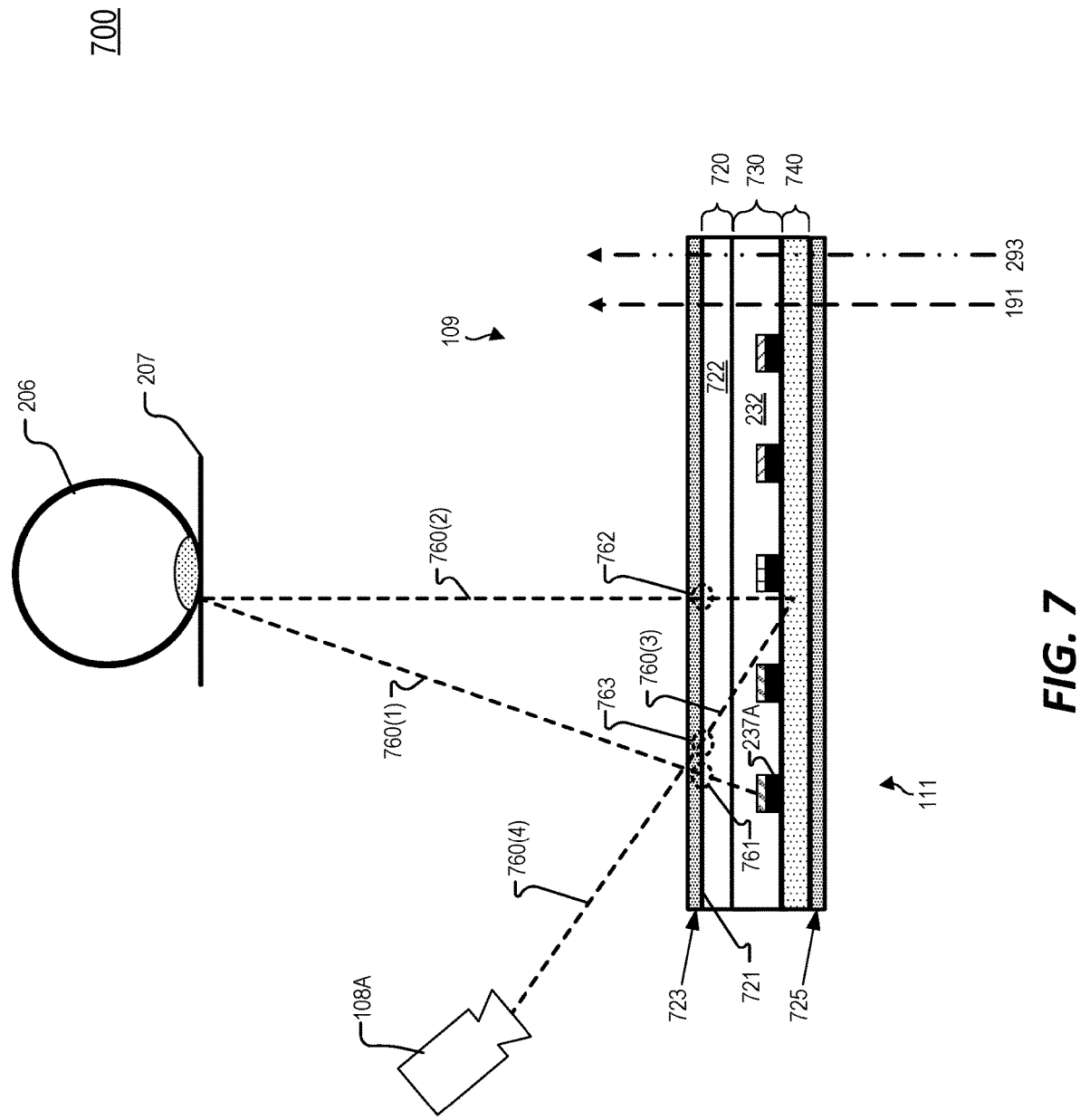
FIG. 7 illustrates an example optical system including an AR coating disposed on a base curvature and an optional quarter-waveplate (QWP) and linear polarizer, in accordance with aspects of the disclosure.

Eye 206 reflects at least a portion of the infrared illumination light 239 back to element 210 as reflected infrared light (not illustrated in FIG. 2) and the reflected infrared light propagates through layers 220 and 230 before encountering combiner layer 240. Combiner layer 240 is configured to receive the reflected infrared light and direct the reflected infrared light to the camera 108A to generate eye-tracking images. As an example, FIG. 7 illustrates reflected infrared light propagating along optical path 760(2) being redirected to camera 108A by combiner layer 740.

Returning to FIG. 2, camera 108A is configured to capture eye-tracking images of eye 206. Camera 108A may include an infrared bandpass filter to pass the wavelength of the infrared illumination light 239 emitted by the infrared illuminators and block other light from becoming incident on an image sensor of camera 108A. Camera 108A may include a complementary metal-oxide semiconductor (CMOS) image sensor.

FIG. 2 shows that scene light 191 (visible light) from the external environment may propagate through display layer 250, combiner layer 240, illumination layer 230, and transparent layer 220 to become incident on eye 206 so that a user can view the scene of an external environment. FIG. 2 shows that display layer 250 may generate or redirect display light 293 to present virtual images to eye 206. Display light 293 is visible light and propagates through combiner layer 240, illumination layer 230, and transparent layer 220 to reach eye 206.

Transparent layer 220 may include a base curvature 221 that is the surface closest to eyeward side 109. Base curvature 221 may be configured to focus a virtual image included in display light 293 for an eye of a user. Base curvature 221 may be formed in a refractive material 222 of transparent layer 220 using a subtractive process. The refractive material 222 may have a refractive index of approximately 1.5, in some embodiments. Illumination layer 230 may include a transparent material 232 that may encapsulate the infrared illuminators 237. Transparent material 232 and refractive material 222 are configured to transmit visible light (e.g. 400 nm-700 nm) and near-infrared light (e.g. 700 nm-1.4 µm).

Figure 3:
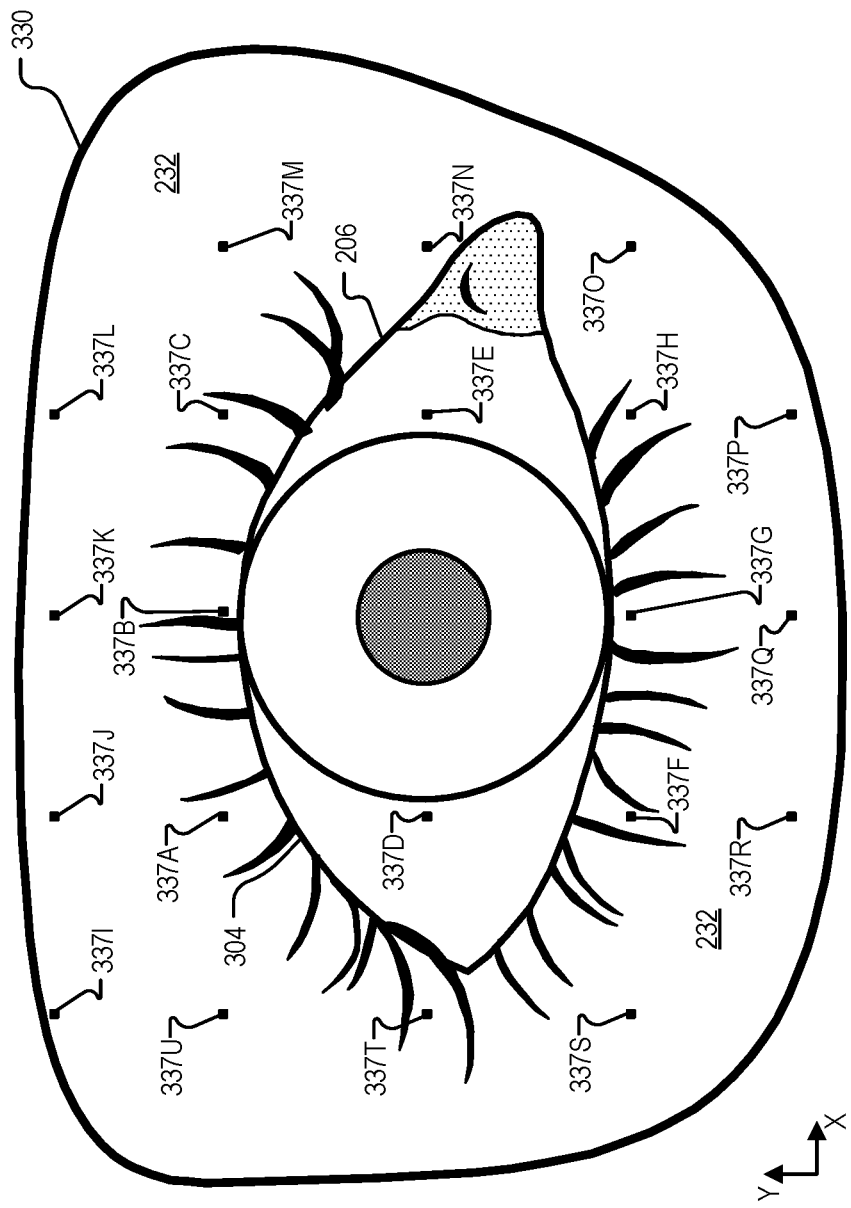
FIG. 3 illustrates a front view of an eye through an example illumination layer, in accordance with aspects of the disclosure.

FIG. 3 illustrates a front view of eye 206 through an example illumination layer 330, in accordance with aspects of the disclosure. In the illustrated embodiment, illumination layer 330 include twenty-one infrared illuminators (337A-337U). In the illustrated example, infrared illuminators 337A-337H may be considered an "inner ring" of infrared illuminators 337 while infrared illuminators 337I-337U are considered an "outer ring" of infrared illuminators 337. As such, infrared illuminators 337I-337U may direct their infrared illumination light to eye 206 at a steeper angle (e.g. 14-25 degrees) than infrared illuminators 337A-337H in the inner ring (e.g. 0-22 degrees).

Figure 4:
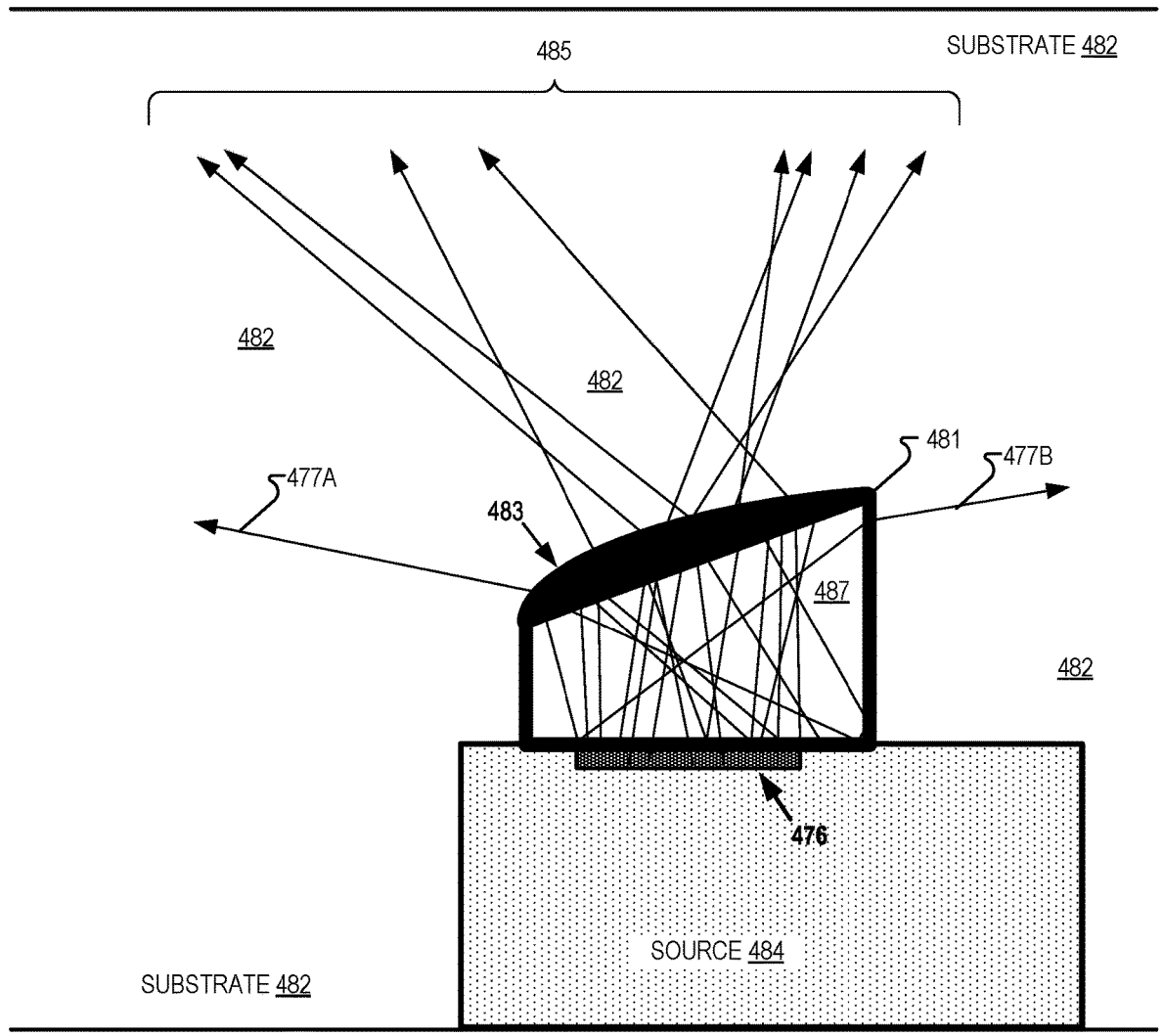
FIG. 4 illustrates an infrared light source.

FIG. 4 illustrates an infrared light source 484. Source 484 is configured to emit infrared illumination light from an output aperture 476 of the infrared light source 484. Beam shaping element 481 is disposed over output aperture 476 and configured to direct the infrared illumination light to an eyebox area (e.g. eyebox area 207) through substrate 482. Substrate 482 may be an example of transparent material 232. However, beam shaping element 481 is formed of a refractive material 487 and the interface 483 between refractive material 487 and substrate 482 may cause a portion of the emitted infrared illumination light to be reflected back into the refractive material 487 of beam shaping element 481. As a consequence of these reflections, the infrared illumination light 485 may not be directed in the designed direction and a significant amount of some of the infrared illumination light may even exit the sides of the beam shaping element 481 (e.g. light 477A and 477B). The infrared illumination light that is not directed in the desired direction is stray light that may eventually become incident on an eye-tracking camera and therefore raise the noise floor and decrease the contrast of an eye-tracking image.

Figure 5:
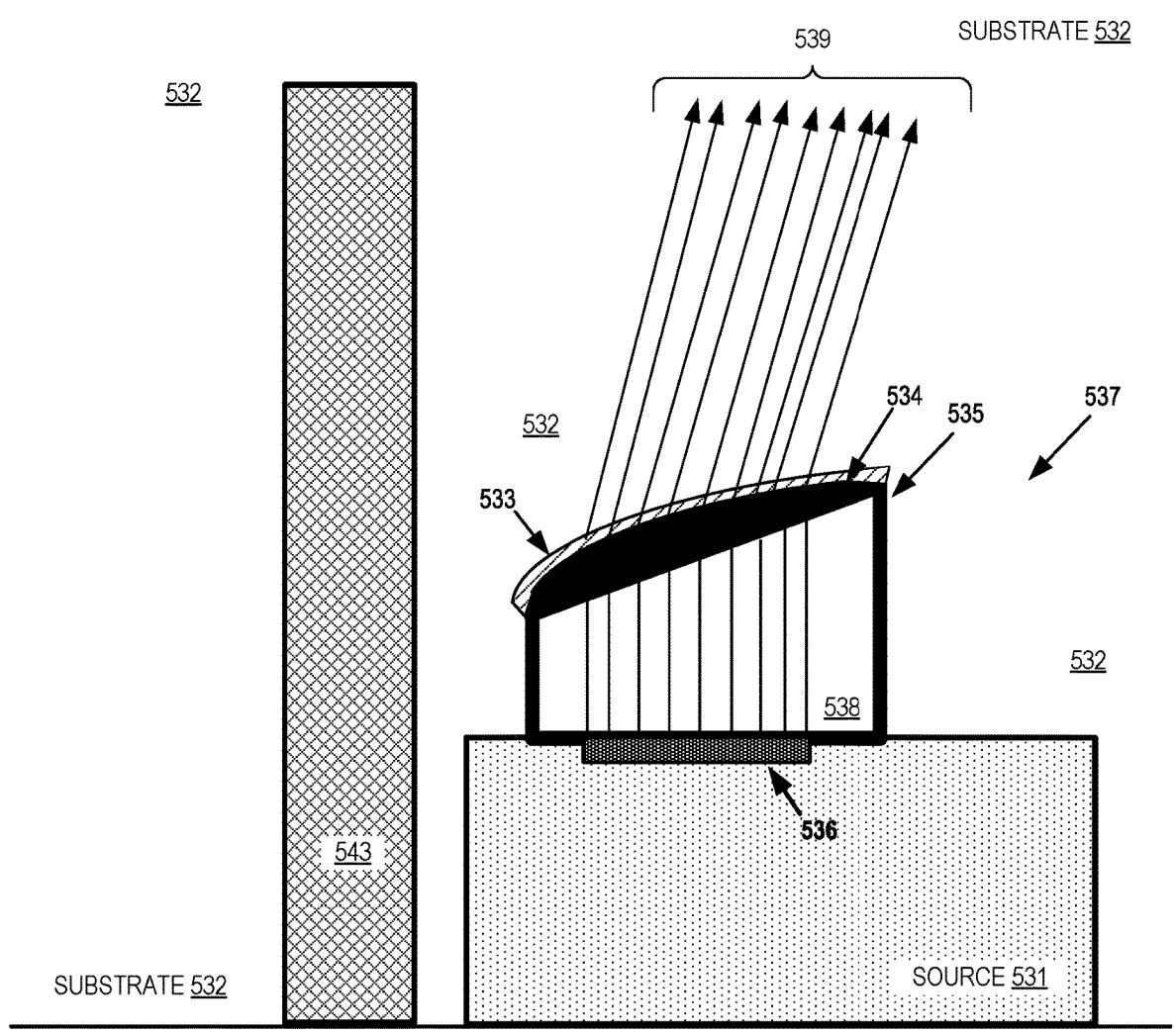
FIG. 5 illustrates an example infrared illuminator, in accordance with aspects of the disclosure.

FIG. 5 illustrates an example infrared illuminator 537 that may be utilized as infrared illuminators 237/337, in accordance with aspects of the disclosure. The example infrared illuminator 537 illustrated in FIG. 5 includes an infrared light source 531 having an output aperture 536 and a beam shaping optic 535 disposed over output aperture 536. Beam shaping optic 535 is configured to direct the infrared illumination light 539 to an eyebox area (e.g. eyebox area 207). In the illustrated embodiment of FIG. 5, anti-reflection (AR) coating 533 is disposed over a lens curvature 534 as a ghost suppression component configured to prevent or suppress stray infrared illumination light from becoming incident on camera 108. Lens curvature 534 may be formed by the refractive material of the beam shaping optic 535. AR coating 533 significantly reduces the reflection of infrared illumination light 539 that would occur at an interface between substrate 532 and refractive material 538. Without an AR coating, reflection may be approximately 15% for near-normal angle-of-incidence (AOI) and increases as the AOI increases. Substrate 532 is a transparent material. Refractive material 538 may be a high-index material having a refractive index of greater than three. In an embodiment, refractive material 538 includes gallium-arsenide (GaAs) and has a refractive index of approximately 3.5. In some embodiments, beam shaping optic 535 is approximately 30 microns wide.

In an embodiment, AR coating 533 is a single layer of silicon-mononitride (SiN) providing 96% or better transmission for infrared light having a wavelength of between 930 nm and 950 nm. In an embodiment, AR coating 533 includes multiple sub-layers allowing for 99.5% transmission for 930-950 nm near-infrared light over an angle-of-incidence (AOI) range of plus-or-minus 26 degrees.

In some embodiments, the illustrated refractive beam shaping optic 535 is replaced by, or includes, a diffractive optical element configured to direct the infrared illumination light 539 to the eyebox area. In one embodiment, an obscuration element 543 is disposed adjacent to the infrared light source 531. Obscuration element 543 may be disposed between the output aperture 536 of the infrared light source 531 and eye-tracking camera 108 to block stray light from reaching the camera (at least directly). Obscuration element 543 may include a wall having a blackened coating to absorb light, for example.

Figure 6:
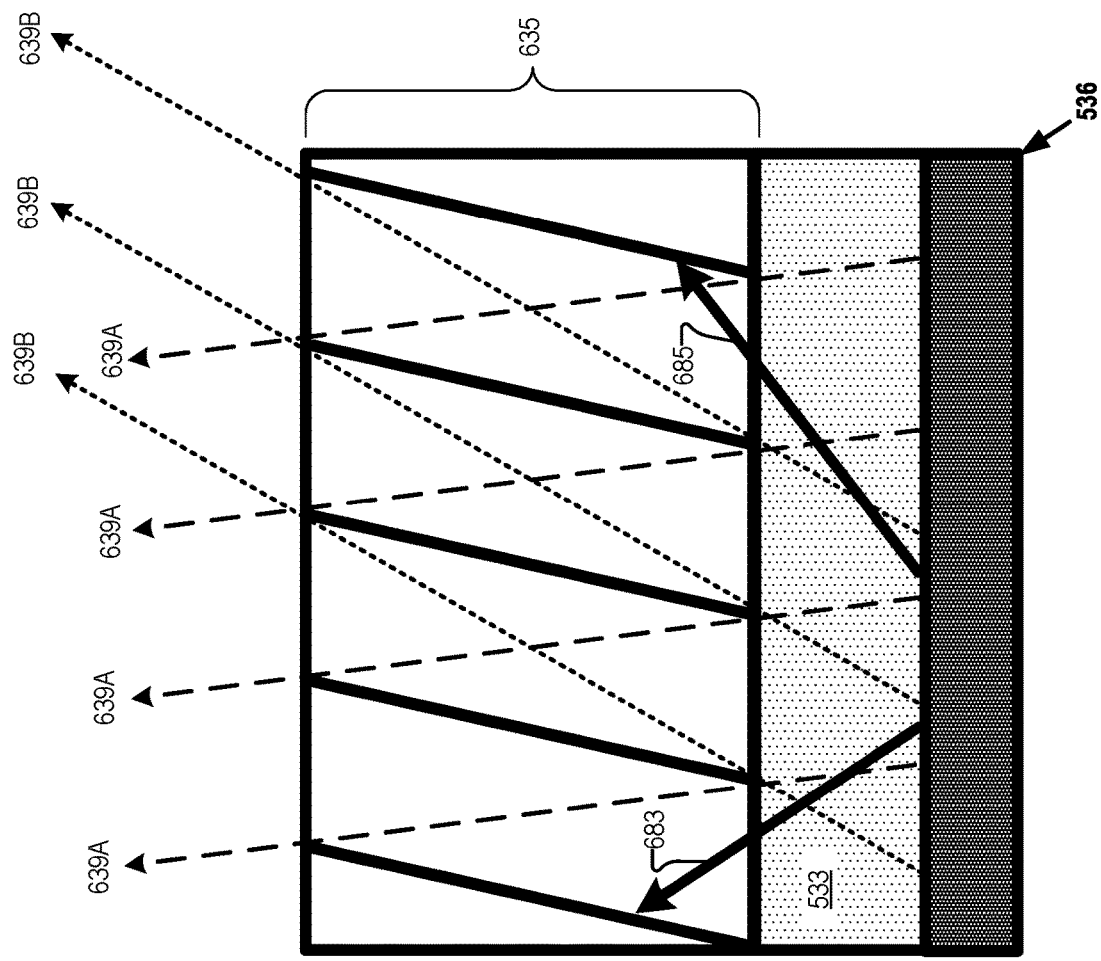
FIG. 6 illustrates an example micro-Louver array, in accordance with aspects of the disclosure.

FIG. 6 illustrates an example micro-Louver array 635 disposed above AR coating 533, in accordance with aspects of the disclosure. The micro-Louver array film 635 functions to pass the light 639 exiting aperture 536 within a designed angle of incidence while light (e.g. rays 683 and 685) that are beyond the designed angle of incidence will be absorbed by the micro-Louver array 635. Thus, the designed angle of incidence for passing light of the micro-Louver array 635 may be constrained to the AOI between light rays 639A and 639B that will exit material 232 and 222 without internal reflection. In some embodiments, micro-Louver array 635 may be disposed above lens curvature 534 as a ghost suppression element without AR coating 533 included in infrared illuminator 537.

FIG. 7 illustrates an example optical system 700 including an AR coating 723 disposed on a base curvature 721 of an example transparent layer 720, in accordance with aspects of the disclosure. In FIG. 7, infrared illuminator 237A is configured to direct narrow-band infrared illumination light to an eyebox area 207 along optical path 760(1).

Intersection 761 illustrates that the infrared illumination light emitted by infrared illuminator 237A would encounter an interface between the air and refractive material 722 of transparent layer 720 if AR coating 723 was not included. Without AR coating 723, at least 5% of the infrared illumination light would be lost (reflected) at intersection 761 and transmission would decrease as the AOI increases. However, AR coating 723 significantly reduces the reflection of the infrared illumination light and thereby suppresses the Fresnel reflections that contribute to stray light. Reflected infrared light is the narrow-band infrared illumination light that is reflected off of eye 206 and propagates along optical path 760(2). Intersection 762 illustrates that the reflected infrared light would encounter an interface between the air and the refractive material 722 of transparent layer 720 if AR coating 723 was not included. Here again, without AR coating 723, at least another 5% of the reflected infrared light would be lost due to reflection. Yet, with AR coating 723 disposed on base curvature 721, stray light from reflections is suppressed and the intensity of the reflected infrared light (that includes the image of eye 206) is preserved at a higher intensity.

The portion of reflected infrared light that propagates through transparent layer 720 and illumination layer 730 is directed by combiner layer 740 to camera 108 for generating eye-tracking images along optical path 760(3). Intersection 763 illustrates that the reflected infrared light would encounter a third interface between the air and the refractive material 722 of transparent layer 720 if AR coating 723 was not included. However, AR coating 723 reduces the reflections that would contribute to ghost images and preserves the reflected infrared light by allowing a very-high transmission of the reflected infrared light propagating along optical path 760(3). FIG. 7 illustrates that the portion of the reflected infrared light that propagates through AR coating 723 at intersection 763 continues to camera 108A along optical path 760(4). FIG. 7 illustrates that example optical system 700 may optionally include a second AR coating 725 disposed on a backside 111 of combiner layer 740.

Notably, reflected infrared light propagating along optical path 760(3) becomes incident upon AR coating 723 at a relatively steep angle. For example, the reflected infrared light may become incident upon AR coating 723 at an angle of incidence of 50, 60 or even 70 degrees. Therefore, AR coating 723 has very-high transmission for a narrow-band of infrared light over an AOI range where the narrow-band of infrared light corresponds to the wavelength of the narrow-band infrared illumination light emitted by infrared illuminators 237. AR coating 723 also must have very-high transmission of infrared light over a normal and near-normal AOI, as illustrated at intersections 761 and 762. FIG. 7 also shows that visible light wavelengths from scene light 191 and display light 293 will propagate through AR coating 723 to eyebox area 207 and, hence, AR coating 723 would ideally have very-high transmission of visible light. However, conventional AR coatings have poor performance when very-high transmission is required in both the visible light spectrum and the near-infrared spectrum along over a wide AOI. For example, a conventional AR coating may provide approximately very-high transmission for an AOI range of plus-or-minus 70 degrees for 500 nm (visible wavelengths), but the transmission of 940 nm (near-infrared wavelength) may erode significantly as the AOI approaches 60 degrees or greater.

Conventional AR coatings are generally tuned for visible light incident at near-normal angles of incidence. In contrast, AR coating 723 would preferably be tuned for very-high infrared transmission at a wide AOI range in addition to very-high transmission of visible light at a significant AOI range. "Very-high transmission" is defined as above 90%, for purposes of this disclosure.

In some embodiments of AR coating 723, the significant AOI range for the visible light is greater than plus-or-minus 40 degrees and the wide AOI range for the narrow-band infrared illumination light is greater than plus-or-minus 40 degrees. The transmission spectrum of the AR coating 723 may transmit greater than 90% of the visible light over the plus-or-minus 40 degrees AOI and the transmission spectrum of the AR coating 723 may transmit greater than 95% of the narrow-band of infrared light over plus-or-minus 40 degrees AOI. In another embodiment, the transmission spectrum of the AR coating 723 transmits greater than 90% of visible light over a plus-or-minus 70 degrees AOI and the transmission spectrum of the AR coating 723 transmits greater than 95% of the narrow-band of infrared light over the plus-or-minus 70 degrees AOI.

An example multilayer AR coating may include titanium-dioxide ($TiO_2$) and silicon-dioxide ($SiO_2$) sublayers. Another example multilayer AR coating may include hafnium-dioxide sublayers ($HfO_2$) and magnesium-fluoride ($MgF_2$) sublayers. The AR coating 723 may be tuned for very-high transmission for visible light over a significant AOI range and very-high transmission for a narrow-band of infrared light (937 nm-950 nm) over a wide AOI range. The AR coating may be specifically tuned for very-high transmission of narrow-band infrared illumination light corresponding with a VCSEL or a SLED infrared illuminator 237 emitting 940 nm light, for example. In other embodiments, the narrow-band of infrared light may have different wavelengths. The transmission spectrum of an AR coating may be tuned for less than very-high transmission of at least a portion of gap-light having wavelengths between the visible light and the narrow-band of infrared light (e.g. 700 nm-937 nm), when very-high transmission is defined as 90% transmission. In some embodiments of the disclosure, "very-high transmission" is 95% transmission or better.

Figure 8:
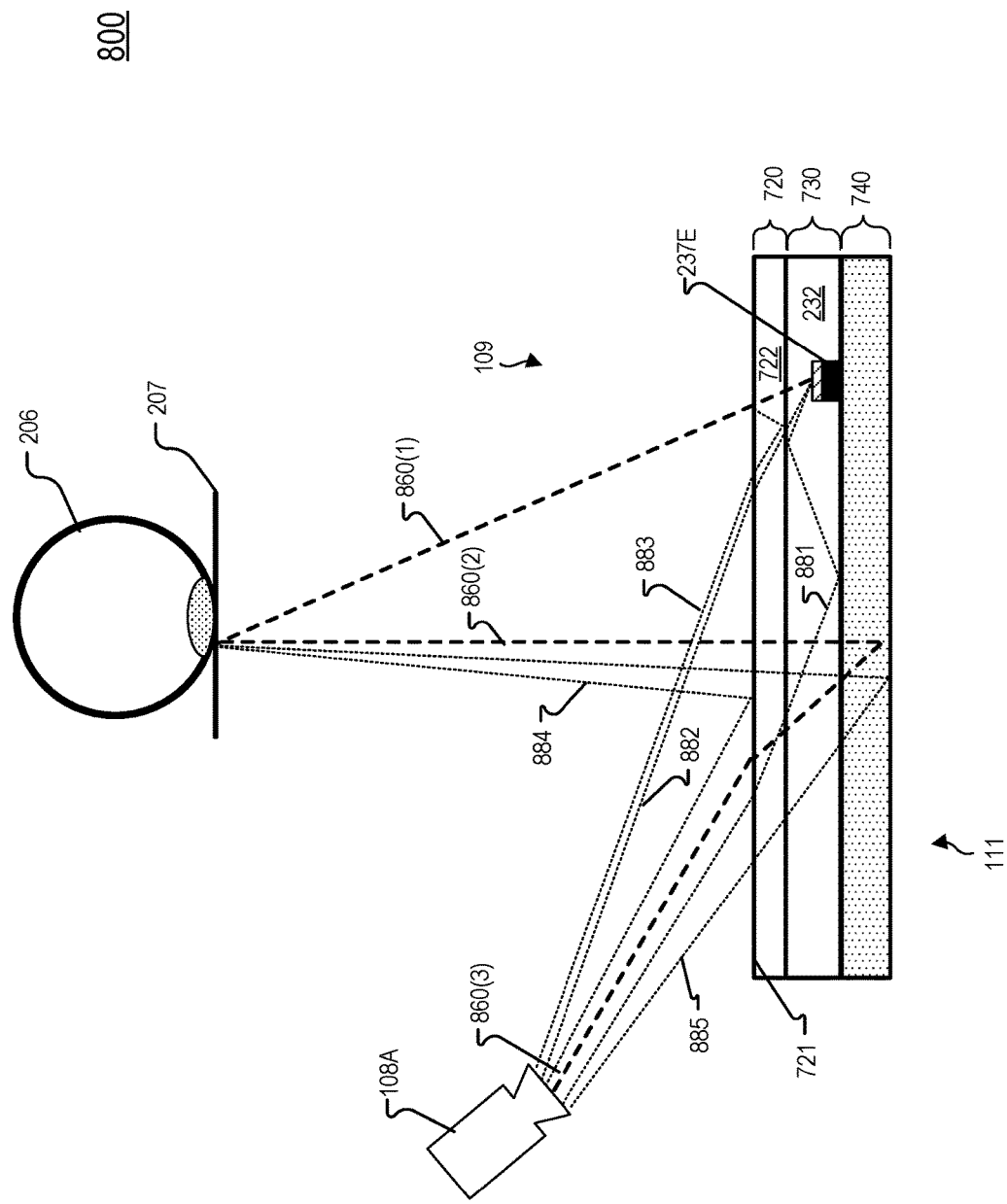
FIG. 8 illustrates an example optical system that illustrates an imaging optical path, in accordance with aspects of the disclosure.

FIG. 8 illustrates an example optical system 800 that illustrates an imaging optical path 860, in accordance with aspects of the disclosure. FIG. 8 illustrates infrared illuminator 237E emitting narrow-band infrared illumination light toward eyebox area 207. Light path 881 illustrates a potential stray light path that may be suppressed by incorporating one or more of the ghost suppression components, described with respect to FIG. 5, into infrared illuminator 237E. Light path 881 may represent stray light exiting the side of a refractive beam shaping optic and then being confined by transparent material 232 by way of total-internal-reflection (TIR), before exiting illumination layer 730 and becoming incident on the camera 108.

Light path 882 illustrates another potential stray light path that may be suppressed by incorporating one or more of the ghost suppression components, described with respect to FIG. 5, into infrared illuminator 237E. Light path 882 may be taken by infrared illumination light that reflects off of the lens curvature (e.g. 534) of the refractive material (e.g. 538) and then continues to reflect within refractive material 538 until exiting along light path 882 and becoming incident on camera 108A. By including, AR coating 533 and/or micro-Louver array film 635 over the lens curvature 534, for example, the initial reflection of the infrared illumination light off the lens curvature is suppressed and therefore more of the infrared illumination light exits the beam shaping optic in the intended direction.

Light path 883 illustrates a potential stray light path that may be suppressed by incorporating an example AR coating, as described in this disclosure. Light path 883 may represent infrared illumination light that encounters base curvature 721 subsequent to exiting infrared illuminator 237E. However, by including an AR coating 723 over base curvature 721, stray light generated from the interface between refractive material 722 and air may be suppressed by decreasing the reflections.

Light path 884 illustrates another potential stray light path that may be suppressed by incorporating an example AR coating, as described in this disclosure. Light path 884 may represent infrared illumination light that reflects off of eye 207 as reflected infrared light and then encounters base curvature 721. However, by including an AR coating 723 over base curvature 721, stray light generated from the interface between refractive material 722 and air may be suppressed by decreasing the reflections.

Light path 885 illustrates yet another potential stray light path that may be suppressed by incorporating an example AR coating, as described in this disclosure. Light path 885 may represent infrared illumination light that reflects off of eye 207 as reflected infrared light and then encounters an interface between combiner layer 740 and another layer. However, by optionally including an AR coating 725 disposed on a backside 111 of combiner layer 740, stray light generated from the interface between combiner layer 740 and another layer may be suppressed by decreasing the reflections.

FIG. 8 illustrates that adding particular features in accordance with aspects of this disclosure allow stray light suppression in more than one intersection along imaging optical path 860. And, suppressing stray light by increasing transmission of infrared light propagating along imaging optical path 860 also assists in retaining the intensity of the infrared light that generates the infrared eye-tracking image. Therefore, embodiments of the disclosure may both suppress stray light and increase the intensity of the desired infrared imaging light and boost the contrast in an eye-tracking image captured by camera 108A. Consequently, reduction of ghost images and increase in image contrast may allow for more efficient identification of the pupil, iris, and other portions of the eye that assist in eye-tracking analysis to determine a position of the eye.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An optical system comprising:
    an infrared illuminator configured to direct narrow-band infrared illumination light to an eyebox area for eye-tracking;
    a camera configured to capture eye-tracking images of an eye of a user;
    a combiner layer configured to receive reflected infrared light of the narrow-band infrared illumination light reflecting off the eye of the user and direct the reflected infrared light to the camera to generate the eye-tracking images; and
    an anti-reflection (AR) coating disposed on a base curvature, wherein a transmission spectrum of the AR coating is tuned for very-high transmission for visible light over a first angle of incidence (AOI) range and very-high transmission for a narrow-band of infrared light over a second AOI range, the narrow-band of infrared light corresponding to the narrow-band infrared illumination light,
    wherein the very-high transmission is above 90%, and wherein the AR coating is tuned for less than very-high transmission for gap-light having wavelengths between visible light and the narrow-band of infrared light.

2. The optical system of claim 1, wherein the first AOI range for the visible light is greater than plus-or-minus 40 degrees and the second AOI range for the narrow-band infrared illumination light is greater than plus-or-minus 40 degrees.

3. The optical system of claim 2, wherein the transmission spectrum of the AR coating transmits greater than 90% of the visible light over the first AOI, and wherein the transmission spectrum of the AR coating transmits greater than 95% of the narrow-band of infrared light over the second AOI.

4. The optical system of claim 1, wherein a second AR coating is disposed on a backside of the combiner layer.

5. The optical system of claim 1, wherein the narrow-band infrared illumination light is above 800 nm.

6. The optical system of claim 1 further comprising:
    a near-eye display layer configured to provide display light that propagates through the combiner layer and then through the base curvature, wherein the base curvature is configured to focus a virtual image included in the display light for a user of the optical system.

7. The optical system of claim 1, wherein the AR coating includes:
    a plurality of titanium-dioxide sub-layers; and
    a plurality of silicon-dioxide sub-layers.

8. The optical system of claim 1, wherein the AR coating includes:
    a plurality of hafnium-dioxide sub-layers; and
    a plurality of magnesium-fluoride sub-layers.

9. A near-eye optical element comprising:
    an infrared light source configured to emit infrared illumination light from an output aperture of the infrared light source;
    a beam shaping optic disposed over the output aperture of the infrared light source, wherein the beam shaping optic is configured to direct the infrared illumination light to an eyebox area, and wherein the beam shaping optic is less than a width of the infrared light source and more than a dimension of the output aperture of the infrared light source;

a transparent material; and a ghost suppression component configured to suppress the infrared illumination light from becoming stray infrared illumination light.

10. The near-eye optical element of claim 9, wherein the beam shaping optic includes a lens curvature formed from a high-index material having a high refractive index, wherein the high refractive index is greater than 3.

11. The near-eye optical element of claim 10, wherein the ghost suppression component includes an anti-reflection (AR) coating disposed between the lens curvature and the transparent material, wherein the AR coating contacts the lens curvature and the transparent material.

12. The near-eye optical element of claim 11, wherein the ghost suppression component includes a micro-Louver array film disposed over the AR coating, and wherein the micro-Louver array film is configured to absorb the infrared illumination light incident upon the micro-Louver array film outside a designed angle of incidence.

13. The near-eye optical element of claim 10, wherein the ghost suppression element includes a micro-Louver array disposed over the lens curvature.

14. The near-eye optical element of claim 9, wherein the beam shaping optic includes a diffractive optical element configured to direct the infrared illumination light to the eyebox area.

15. The near-eye optical element of claim 9, wherein the ghost suppression component includes an obscuration element adjacent to the infrared light source, wherein the obscuration element is disposed less than the width of the infrared light source from the infrared light source.

16. The near-eye optical element of claim 9, wherein the beam shaping optic is less than 200 microns.

17. The near-eye optical element of claim 9, wherein the beam shaping optic is coupled to the infrared light source.

18. A near-eye optical element comprising:

an illumination layer including a plurality of infrared illuminators configured to direct narrow-band infrared illumination light to an eyebox area for eye-tracking, wherein the infrared illuminators include an infrared light source, a beam shaping optic, and a first anti-reflection (AR) coating disposed over the beam shaping optic;

a combiner layer configured to receive reflected infrared light of the narrow-band infrared illumination light reflecting off an eye of a user and direct the reflected infrared light to generate eye-tracking images for a camera, wherein the combiner layer is transmissive to visible light; and a transparent layer having a base curvature, wherein a second AR coating is disposed on the base curvature.

19. The near-eye optical element of claim 18, wherein the illumination layer is disposed between the transparent layer and the combiner layer.

20. The near-eye optical element of claim 18, wherein the first AR coating is tuned for greater than 90% transmission for visible light over plus-or-minus 40 degrees angle of incidence (AOI) and 95% transmission for a narrow-band of infrared light over plus-or-minus 40 degrees AOI, the narrow-band of infrared light corresponding to the narrow-band infrared illumination light.

* * * * *